Dec. 11, 1928.

D. W. DAVIS

CATALYTIC AGENT IN STORAGE BATTERY

Filed Aug. 5, 1927

1,694,530

Inventor,
Dean W. Davis,
By
Minturn & Minturn
Attorneys,

Patented Dec. 11, 1928.

1,694,530

UNITED STATES PATENT OFFICE.

DEAN W. DAVIS, OF ELMHURST, INDIANA, ASSIGNOR TO ALBERT L. NEW, OF GREENFIELD, INDIANA.

CATALYTIC AGENT IN STORAGE BATTERY.

Application filed August 5, 1927. Serial No. 210,765

The object of this invention is to restore or increase the catalysis of an agent such as platinum, in sealed storage batteries, the action of which has been reduced or destroyed by sulphurated hydrogen or other agents developed in the presence of the catalytic agent.

A further object is to so distribute the catalytic agent in the battery that when the battery is tipped, inverted, or moved to any position, some portion of the catalyst will always be free from the more or less liquid electrolyte. This is important because contact of the electrolyte with the catalyst may impair or destroy the catalysis of the latter while the contact occurs.

Another object is to shield the catalyst from the splash of the liquid electrolyte.

The object also is to increase the action of the catalyst by heating it with electricity, preferably by putting it in circuit with the electrodes of the storage cell in which the catalyst is located, and the object further is to close the circuit with the catalyst only while the battery is being recharged and to break it at all other times to avoid exhausting the battery through a closed circuit.

I accomplish the above principal objects and such minor ones as will hereinafter appear, by means illustrated in the accompanying drawing wherein—

Figure 1:
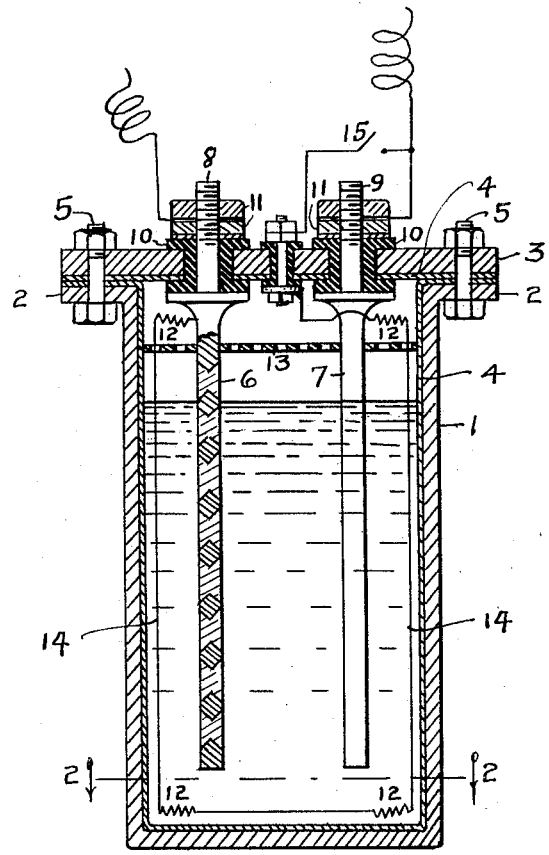
Figure 2:
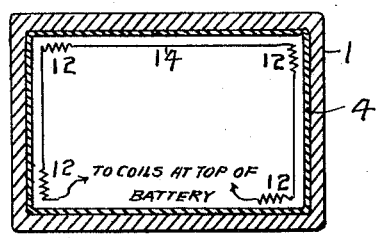

Fig. 1, illustrates a conventional storage battery cell in vertical section with my improvements, and Fig. 2 is a cross section on the line 2—2 of Fig. 1.

An outer shell 1, preferably of steel for strength has a top outside flange 2, upon which a cap-plate 3 is seated. The shell and cap-plate have acid-resisting linings 4 which also extend between the cap-plate and flange as gaskets to make a gas-tight fit therebetween when the cap is closed by bolts 5.

Positive electrodes 6, and negative electrodes 7, are suspended from posts 8 and 9, respectively. The posts pass out through the cap-plate 3, through suitable insulations 10, and are retained by nuts 11. The outer ends of the posts are the terminals for the attachment of conductor-wires through which electric current passes in to recharge the electrodes after they have become exhausted and through which current passes out afterwards.

The major and lower portions of the electrodes 6 and 7 are surrounded by an electrolyte comprising a dilute sulphuric acid. Principally during the operation of recharging, the water in the electrolyte is decomposed and oxygen given off from the positive pole and hydrogen from the negative one, and are collected at the top of the shell 1.

Experience has taught that the presence of sulphurated hydrogen reduces the catalytic action and that the wetting of the catalyst by its submersion in the electrolyte, as when the battery is tipped or inverted, or by splashing, impairs or destroys its action.

To insure that there shall be an unsubmerged catalyst in all positions in which the battery may be placed, I install a coil of catalytic material 12 in each of the corners, at both ends of the shell 1, and I provide a perforated baffle plate 13 between the electrolyte and the coils 12 at the top end of the shell to protect the catalyst from the splash of the electrolyte while the battery is in its position of greatest use with this end uppermost.

I have found in practice that heating the catalyst to a red heat (coils 12) causes the reunion of the oxygen and hydrogen into water at a much lower pressure, and this heating is accomplished by connecting the catalytic coils in series by conductors 14, and with one of the electrodes as 6, within the shell and with the other 7, or its wire conductor, on the outside of the shell. The outside connection may contain a circuit breaker 15 by which the circuit between the electrodes may be broken when the recharging of the battery is discontinued in order to avoid exhausting the battery by a short circuit between its electrodes.

While I have shown and described my invention with more or less minuteness as regards details of construction and arrangement and as being embodied in a storage battery cell, it is applicable to any cell in which water is decomposed such as a gas interrupter, an electrolytic condenser or a rectifier and I do not desire to be limited to the form here shown unduly or any more than is pointed out in the claims. On the contrary, I contemplate all proper changes in form, and arrangement, the omission of immaterial elements and the substitution of equivalents as circumstances may suggest or as necessity may render expedient.

I claim:

1. In an electric accumulator subject to tilting and inversion, electrodes, a more or less liquid electrolyte from which gases may be evolved, a sealed holder and a catalyst for promoting the combining of said gases distributed to such positions within the holder that at least one portion of the catalyst will be unsubmerged in any and all positions of the accumulator.

2. In an electric accumulator subject to tilting and inversion, electrodes, a more or less liquid electrolyte from which gases may be evolved, a sealed holder and a catalyst for promoting the combining of said gases distributed to such positions within the holder that at least one portion of the catalyst will be unsubmerged in any and all positions of the accumulator, and means for heating the catalyst while the accumulator is being recharged.

In testimony whereof I affix my signature.

DEAN W. DAVIS.